(12) United States Patent
Mizoguchi

(10) Patent No.: US 10,571,350 B2
(45) Date of Patent: Feb. 25, 2020

(54) PRESSURE SENSOR

(71) Applicant: NABTESCO CORPORATION, Tokyo (JP)

(72) Inventor: Takashi Mizoguchi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 193 days.

(21) Appl. No.: 15/559,868

(22) PCT Filed: Mar. 22, 2016

(86) PCT No.: PCT/JP2016/059021
§ 371 (c)(1),
(2) Date: Sep. 20, 2017

(87) PCT Pub. No.: WO2016/152868
PCT Pub. Date: Sep. 29, 2016

(65) Prior Publication Data
US 2018/0058966 A1    Mar. 1, 2018

(30) Foreign Application Priority Data

Mar. 23, 2015    (JP) .................................. 2015-059882

(51) Int. Cl.
*G01L 9/16* (2006.01)
*G01L 9/00* (2006.01)

(52) U.S. Cl.
CPC .............. *G01L 9/16* (2013.01); *G01L 9/0029* (2013.01)

(58) Field of Classification Search
CPC ............ G01L 9/00; G01L 9/0029; G01L 9/16
See application file for complete search history.

(56) References Cited

U.S. PATENT DOCUMENTS

| 2,887,882 | A | * | 5/1959 | Richter | ...................... G01L 9/16 |
| | | | | | 324/205 |
| 4,412,454 | A | * | 11/1983 | Yamashita | ................. G01L 9/16 |
| | | | | | 336/20 |
| 5,165,284 | A | * | 11/1992 | Shoji | ......................... G01L 9/16 |
| | | | | | 336/30 |
| 5,303,595 | A | | 4/1994 | Shoji et al. | |
| 2008/0196513 | A1 | | 8/2008 | Lifvenborg | |

FOREIGN PATENT DOCUMENTS

| EP | 1854993 A1 | 11/2007 | |
| JP | 6-180262 A | 6/1994 | |
| JP | 06180262 A | * 6/1994 | ............... G01N 9/16 |
| JP | 2009-507242 A | 2/2009 | |

OTHER PUBLICATIONS

Extended European Search Report EP Application No. 16768771.4 dated Oct. 15, 2018.
International Search Report PCT/JP2016/059021 dated Apr. 19, 2016 with English translation.
International Preliminary Report on Patentability PCT/JP2016/059021 dated Sep. 26, 2017.

* cited by examiner

*Primary Examiner* — Nguyen Q. Ha
(74) *Attorney, Agent, or Firm* — Pillsbury Winthrop Shaw Pittman, LLP

(57) ABSTRACT

A pressure sensor is provided with a cylindrical body made of a magnetostrictive material and configured to be deformed under a pressure of a fluid flowing inside and a detection portion configured to detect a change in magnetic field caused by distortion of the cylindrical body. The cylindrical body is provided with a peripheral wall portion curved or bent in an axial direction of the cylindrical body.

4 Claims, 14 Drawing Sheets

PRESSURE SENSOR

CROSS-REFERENCE TO RELATED APPLICATIONS

This application is the U.S. National Stage of PCT/JP2016/059021, filed Mar. 22, 2016, which in turn claims priority to Japanese Patent Application No. JP 2015-059882, filed Mar. 23, 2015. The contents of these applications are incorporated herein by reference in their entireties.

TECHNICAL FIELD

The present invention relates to a magnetostrictive pressure sensor.

BACKGROUND

A magnetostrictive pressure sensor is a sensor that utilizes an inverse magnetostrictive effect in which a magnetization direction of a magnetostrictive material changes due to distortion of the magnetostrictive material. Patent Literature 1 discloses a device provided with a bottom portion connected to a cylinder of an engine, an upper portion that functions as a cover, and a channel that extends through the bottom portion and the upper portion and receives an inflow of gas in the cylinder. An end portion of the channel on an opposite side to a gas entrance side thereof is closed, and a tube is provided in the channel. A wall portion of the tube becomes deformed under a pressure inside the tube. Furthermore, such deformation of the tube is transmitted to a measurement unit provided in the bottom portion via a first measurement body provided in the bottom portion so as to be in contact with the tube and a second measurement body also provided in the bottom portion so as to be in contact with the tube. The measurement unit is formed of a magnetoelastic sensor, a distortion gauge sensor, a piezoelectric sensor, or the like.

RELEVANT REFERENCES

List of Relevant Patent Literatures

Patent Literature 1: Japanese Patent Application Publication (Translation of PCT Application) No. 2009-507242

SUMMARY

In the device configured as above, a change in pressure of gas in the tube is indirectly measured via the tube in the channel and the bottom portion. Because of this, a pressure of the gas is measured in a state where manufacturing errors or the like of the tube and the bottom portion are cumulatively incorporated, which has been a cause of a decrease in accuracy of a measured pressure. This is not a problem limited to a sensor device having the above-mentioned configuration but is a problem generally common to magnetostrictive pressure sensors.

The present invention has been made in view of these circumstances and has as its object to provide a pressure sensor configured to directly measure a change in pressure of a fluid and thus capable of improving accuracy of a measured pressure.

The following describes means for solving the above-described problem and effects obtained thereby. A pressure sensor according to one aspect of the present invention for solving the above-described problem is provided with a cylindrical body made of a magnetostrictive material and configured to be deformed under a pressure of a fluid flowing inside and a detection portion configured to detect a change in magnetic field caused by distortion of the cylindrical body. The cylindrical body is provided with a peripheral wall portion curved in an axial direction of said cylindrical body (namely, a peripheral wall portion whose longitudinal section along a plane including an axis of the cylindrical body has a curved portion or a peripheral wall portion having a portion continuously varying in thickness along the axis of the cylindrical body) or a peripheral wall portion bent in the axial direction of said cylindrical body (namely, a peripheral wall portion whose longitudinal section along the plane including the axis of the cylindrical body has a bent portion or a peripheral wall portion having a portion varying stepwise in thickness along the axis of the cylindrical body).

According to the above-described configuration, the cylindrical body itself configured to receive a pressure of a fluid is made of a magnetostrictive material, and a change in magnetic field caused by distortion of the magnetostrictive material is detected by the detection portion. Thus, compared with a sensor in which a pressure receiving portion configured to receive a pressure of a fluid and a magnetostrictive material are provided as separate bodies, a change in pressure of a fluid can be directly detected. Furthermore, since the peripheral wall portion of the cylindrical body is curved or bent in the axial direction of the cylindrical body, a change in magnetic field of the cylindrical body is increased, and thus detection of a change in magnetic field can be facilitated.

With regard to the above-described pressure sensor, it may also be possible that the peripheral wall portion of the cylindrical body has a uniform thickness. In this case, preferably, part of the peripheral wall portion in the axial direction of the cylindrical body protrudes to a radially inner side or a radially outer side of the cylindrical body.

According to the above-described configuration, part of the peripheral wall portion having a uniform thickness protrudes to the radially inner side or the radially outer side, and thus the peripheral wall portion of the cylindrical body is curved or bent in the axial direction of the cylindrical body. With this configuration, compared with a case where an inner peripheral surface or an outer peripheral surface of the peripheral wall portion is made to protrude by making the peripheral wall portion vary in thickness, a protruding amount of the peripheral wall portion is easily adjustable, and thus the peripheral wall portion can be so shaped that a change in magnetic field is easily detectable.

With regard to the above-described pressure sensor, it may also be possible that the peripheral wall portion of the cylindrical body has a thickness varying along the axial direction of said cylindrical body. According to the above-described configuration, a thickness of the peripheral wall portion varies in the axial direction of the cylindrical body, so that the peripheral wall portion of the cylindrical body is curved or bent in the axial direction of the cylindrical body. Therefore, the detection portion is provided at a position where a thickness of the peripheral wall portion varies, and thus a change in magnetic field can be detected.

A pressure sensor according to another aspect of the present invention for solving the above-described problem is provided with a cylindrical body made of a magnetostrictive material and configured to be deformed under a pressure of a fluid flowing inside and a detection portion configured to detect a change in magnetic field of the cylindrical body. A peripheral wall portion of the cylindrical body is provided with a stepped surface intersecting with an axial direction of said cylindrical body.

According to the above-described configuration, the cylindrical body itself configured to receive a pressure of a fluid is made of a magnetostrictive material, and a change in magnetic field caused by distortion of the magnetostrictive material is detected by the detection portion. Thus, compared with a sensor in which a pressure receiving portion configured to receive a pressure of a fluid and a magnetostrictive material are provided as separate bodies, a change in pressure of a fluid can be directly detected. Furthermore, since the peripheral wall portion of the cylindrical body is provided with the stepped surface intersecting with the axial direction of the cylindrical body, a change in magnetic field in the axial direction of the cylindrical body when the cylindrical body is distorted is increased, and thus detection of a change in magnetic field can be facilitated.

With regard to the above-described pressure sensor, preferably, there is provided a magnetic field generation portion provided on an outer periphery of the cylindrical body and configured to generate a magnetic field in which a magnetic flux direction includes a direction parallel to the axial direction of said cylindrical body. According to the above-described configuration, a magnetic field along the axial direction of the cylindrical body is generated by the magnetic field generation portion such as a permanent magnet, an excitation coil, or the like, and thus an amount of change in magnetic field along the axial direction of the cylindrical body when the cylindrical body is distorted can be increased. This facilitates detection of a change in magnetic field in the axial direction of the cylindrical body by the detection portion.

Advantages

According to the present invention, a change in pressure of a fluid is directly measured, and thus accuracy of a measured pressure can be improved. Other aspects and advantages of the present invention will be made apparent from a description below, together with drawings showing examples of technical ideas of the present invention.

DESCRIPTION OF THE PREFERRED EMBODIMENTS

First Embodiment

Figure 1:
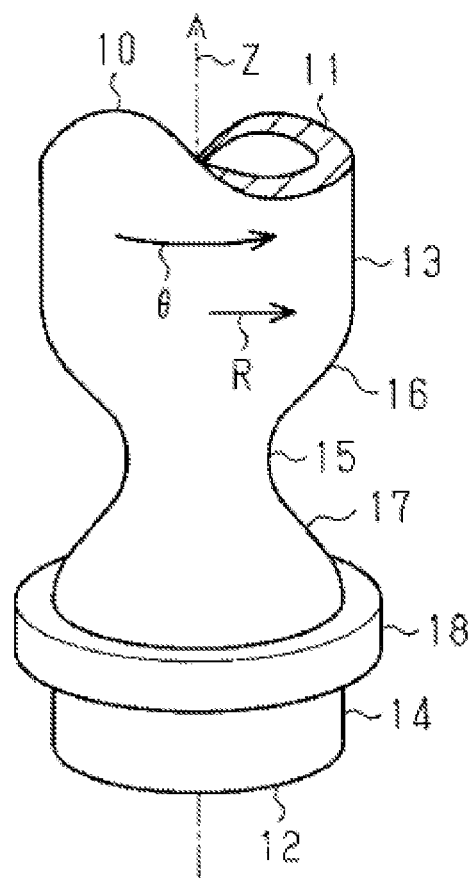
FIG. 1 is a perspective view showing part of a pressure sensor of a first embodiment of the present invention.
Figure 2:
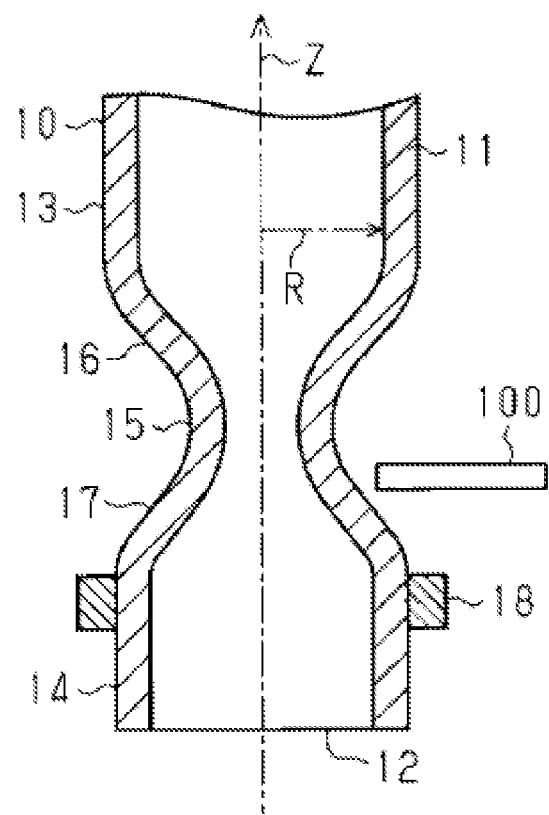
FIG. 2 is a sectional view of the pressure sensor of the first embodiment, as cut parallel to an axial direction of a cylindrical body.

With reference to FIG. 1 and FIG. 2, the following describes a pressure sensor of a first embodiment of the present invention. The pressure sensor of this embodiment may be used as a sensor that detects a pressure in an exhaust passage of an engine. The pressure sensor may be provided in the exhaust passage or a flow passage connected to the exhaust passage.

As shown in FIG. 1, the pressure sensor may be provided with a cylindrical body 10. The cylindrical body 10 may be provided at one end portion thereof with an introduction port 12 into which exhaust gas in the exhaust passage is introduced. Exhaust gas introduced through the introduction port 12 into the cylindrical body 10 may flow inside the cylindrical body 10. The other end portion of the cylindrical body 10 may be closed or connected to another duct. In a case where the cylindrical body 10 is connected to another duct, an end portion of said duct on an opposite side to an end portion thereof connected to the cylindrical body 10 may be closed. With a rise in pressure in the exhaust passage, a pressure in the cylindrical body 10 may also rise, and with a fall in pressure in the exhaust passage, a pressure in the cylindrical body 10 may also fall.

The cylindrical body 10 may be made of a magnetostrictive material whose magnetization direction changes when it is subjected to stress. Such a magnetostrictive material may be, for example, a rare earth-transition metal-based alloy including a rare-earth element and a transition metal element, a transition metal-based alloy including a plurality of transition metal elements, or the like, with no particular limitation on a composition of a magnetostrictive material. Furthermore, a magnetostrictive material constituting the cylindrical body 10 may have, along with elasticity, heat resistance and corrosion resistance to a fluid (herein, exhaust gas) as a subject of measurement.

A peripheral wall portion 11 of the cylindrical body 10 may have a uniform thickness and be curved in an axial direction Z (a center axis) of the cylindrical body 10. In other words, the cylindrical body 10 may have an outer diameter and an inner diameter varying along the axial direction Z. In still other words, a longitudinal section of the peripheral wall portion 11 of the cylindrical body 10 along a plane including an axis of the cylindrical body 10 may have a curved portion. The peripheral wall portion 11 may have a small diameter portion 15 having relatively small outer and inner diameters and large diameter portions 13 and 14 provided on both sides interposing the small diameter portion 15 therebetween and having relatively large outer and inner diameters. Between the small diameter portion 15 and the large diameter portion 13, there may be provided a continuation portion 16 having outer and inner diameters gradually increasing from the small diameter portion 15 toward the large diameter portion 13. Furthermore, between the small diameter portion 15 and the large diameter portion 14, there may be provided a continuation portion 17 having outer and inner diameters gradually increasing from the small diameter portion 15 toward the large diameter portion 14. The continuation portions 16 and 17 may have inclined inner-side and outer-side surfaces. When the small diameter portion 15 is short in length in the axial direction Z, there may be a case where the small diameter portion 15 and the continuation portions 16 and 17 cannot be clearly distinguished from each other. In such a case, the small diameter portion 15 may be assumed to include the continuation portions 16 and 17.

Furthermore, on an outer periphery of the cylindrical body 10, there may be provided a magnetic field generation portion 18 that generates a magnetic field along a direction parallel to the axial direction Z of the cylindrical body 10. The magnetic field generation portion 18 may be formed of an excitation coil that is supplied with an electric current to generate a magnetic field or an annular permanent magnet.

The cylindrical body 10 may be elastically deformed with a change in pressure in the exhaust passage. That is, as a pressure in the exhaust passage rises, the cylindrical body 10 may expand in such a direction that outer and inner diameters thereof increase. Furthermore, when a pressure in the exhaust passage turns from rise to fall, the cylindrical body 10, which has expanded, may shrink and return to a normal state with no elastic deformation. With expansion and shrinkage of the cylindrical body 10, there may occur a change in magnetization direction of the cylindrical body 10. In this case, since a magnetic flux density in the axial direction Z may have been increased by the magnetic field generation portion 18, a change in magnetization direction in the axial direction may be noticeable compared with a magnetization direction in a radial direction and thus be easily detectable. A radial direction R of the cylindrical body 10 may refer to a direction directed in a radial manner from the center axis of the cylindrical body 10 toward the peripheral wall portion 11, and not a direction directed from the center axis toward a point on an inner peripheral surface of the peripheral wall portion 11.

As shown in FIG. 2, a detection portion 100 may be provided outside the cylindrical body 10. The detection portion 100 may be provided in a vicinity of a portion of the cylindrical body 10 in which outer and inner diameters of the cylindrical body 10 vary or a vicinity of an inflection point of the peripheral wall portion 11. Specifically, the detection portion 100 may be provided in a vicinity of the continuation portions 16 and 17. While it may be preferable that the detection portion 100 be not in contact with the cylindrical body 10, it may also be possible that the detection portion 100 is in contact therewith. The detection portion 100 may be formed by, for example, forming a metal pattern on a surface of a substrate or by performing etching or the like on the surface of the substrate so that a metal pattern is exposed thereon. Or alternatively, it may also be possible that the detection portion 100 is formed of a Hall element, a gauss meter using a Hall element, a pick-up coil, or the like. The detection portion 100 may be connected to a detection circuit that detects, for example, a magnitude of an output voltage from the detection portion 100.

In the vicinity of the continuation portions 16 and 17 of the peripheral wall portion 11, a magnetic flux density in the direction parallel to the axial direction Z may be relatively increased because of magnetic flux generated from the small diameter portion 15 and magnetic flux in the axial direction Z generated from the large diameter portions 13 and 14. For this reason, when the cylindrical body 10 made of a magnetostrictive material is subjected to stress, an amount of change in magnetization direction may tend to be relatively increased in the vicinity of the continuation portions 16 and 17. Therefore, the detection portion 100 may be provided in the vicinity of the continuation portions 16 and 17, and thus detection of a change in pressure may be facilitated.

Furthermore, since the small diameter portion 15 having a relatively small flow passage cross-sectional area may be provided between the large diameter portions 13 and 14, a pressure on an introduction port 12 side of the small diameter portion 15 becomes higher than a pressure in the exhaust passage. However, by using a map associating a voltage induced in the detection portion 100 with a pressure in the exhaust passage or an arithmetic expression used to arithmetically determine a pressure in the exhaust passage based on such a voltage, a pressure in the exhaust passage can be arithmetically determined.

Furthermore, an amount (a width) in which the small diameter portion 15 of the peripheral wall portion 11 protrudes to a radially inner side of the cylindrical body 10, namely, a difference between a radius of the large diameter portions 13 and 14 and a radius of the small diameter portion 15 can be adjusted by changing a shape of the peripheral wall portion 11. Thus, a difference between a radius of the large diameter portions 13 and 14 and a radius of the small diameter portion 15 could be so adjusted that a change in magnetization direction in the direction parallel to the axial direction Z is easily detectable by the detection portion 100.

Next, with reference to FIG. 2, a description is given of a function of the pressure sensor. When a pressure in the cylindrical body 10 rises with a rise in pressure in the exhaust passage, the cylindrical body 10 may isotropically expand in such a direction that a diameter of the cylindrical body 10 increases. Since the inner-side surfaces of the continuation portions 16 and 17 may be inclined, the continuation portions 16 and 17 may expand not only in a direction parallel to the radial direction R (namely, a direction orthogonal to the axial direction Z) but also in the direction parallel to the axial direction Z. When the continuation portions 16 and 17 expand in the direction parallel to the radial direction R and in the direction parallel to the axial direction Z as described above, a radius of curvature of the continuation portions 16 and 17 may vary, thus facilitating detection of magnetic flux leakage. The peripheral wall portion 11 as a whole may be subjected to tensile stress mainly in a circumferential direction θ (see FIG. 1). This may cause a change in magnetization (magnetic flux) direction of the peripheral wall portion 11, so that a voltage may be induced in the detection portion 100. The detection portion 100 may output an electric signal corresponding to the induced voltage to a detection circuit. Based on the electric signal inputted from the detection portion 100, the detection circuit may arithmetically determine a pressure in the cylindrical body 10.

When a pressure in the exhaust passage falls after it has risen to such an extent as to cause expansion of the cylindrical body 10, the cylindrical body 10 may shrink. As a result, the peripheral wall portion 11 may be subjected to less tensile stress in the circumferential direction θ, so that a magnetization (magnetic flux) direction may change inversely to a case where the cylindrical body 10 has expanded. Based on an electric signal inputted from the detection portion 100, the detection circuit may arithmetically determine a pressure in the cylindrical body 10.

As thus described, according to the pressure sensor of this embodiment, the following effects can be obtained. (1) The cylindrical body 10 itself configured to receive a pressure of exhaust gas, which is a fluid, may be made of a magnetostrictive material, and a change in magnetization direction caused by distortion of the magnetostrictive material may be detected by the detection portion 100. Thus, compared with a sensor in which a pressure receiving portion configured to receive a pressure of a fluid and a magnetostrictive material are provided as separate bodies, a change in pressure can be directly detected. Furthermore, since the peripheral wall portion 11 of the cylindrical body 10 may be curved in the axial direction Z of the cylindrical body 10 (that is, a longitudinal section of the peripheral wall portion 11 of the cylindrical body 10 along the plane including the axis of the cylindrical body 10 may have a curved portion), a change in magnetization direction in the axial direction Z when the cylindrical body 10 has expanded may be increased, and thus detection of a change in magnetization direction can be facilitated.

(2) A magnetic field including, as a magnetic flux direction, the direction parallel to the axial direction Z of the cylindrical body 10 may be generated by the magnetic field generation portion 18, and thus an amount of change in magnetization direction along the axial direction Z when the cylindrical body 10 is distorted can be increased. Thus, in the detection portion 100, detection of a change in magnetization direction along the axial direction Z of the cylindrical body 10 may be facilitated.

(3) Part of the peripheral wall portion 11 having a uniform thickness may protrude to the radially inner side of the cylindrical body 10 to form the small diameter portion 15, and thus the peripheral wall portion 11 may be curved in the axial direction Z. With this configuration, compared with a case where the inner peripheral surface of the peripheral wall portion 11 is made to protrude by making the peripheral wall portion 11 vary in thickness, a protruding amount of the peripheral wall portion 11 is easily adjustable, and thus the peripheral wall portion 11 can be so shaped that a change in magnetic field is easily detectable.

Second Embodiment

Figure 3:
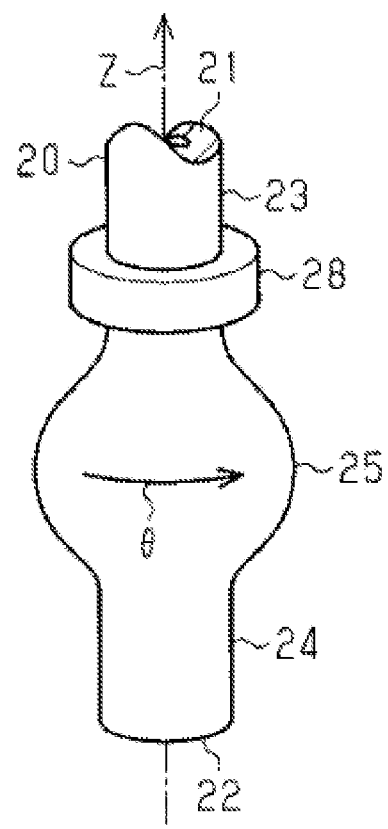
FIG. 3 is a perspective view showing part of a pressure sensor of a second embodiment of the present invention.
Figure 4:
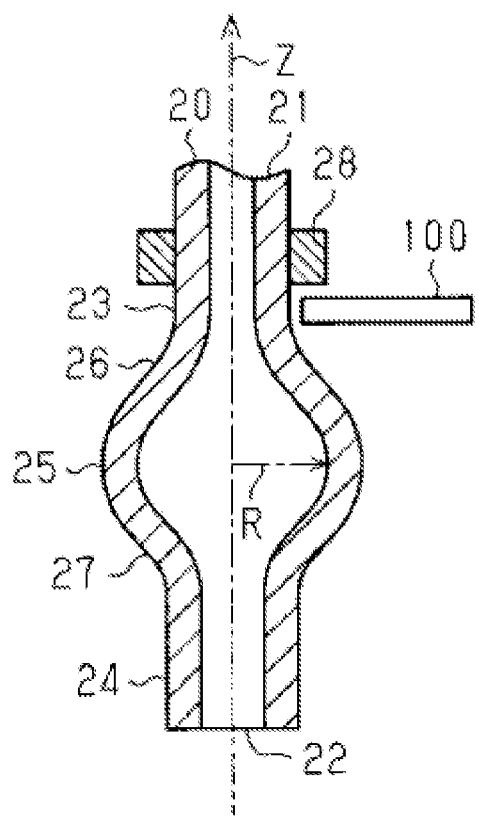
FIG. 4 is a sectional view of the pressure sensor of the second embodiment, as cut parallel to an axial direction of a cylindrical body.

Next, with reference to FIG. 3 and FIG. 4, a description is given of a pressure sensor of a second embodiment of the present invention by focusing on differences from the first embodiment. The pressure sensor according to this embodiment may also have a basic configuration equivalent to that of the first embodiment, for which a duplicate description is omitted.

As shown in FIG. 3, a cylindrical body 20 provided in the pressure sensor may be provided at one end portion thereof with an introduction port 22 into which exhaust gas in an exhaust passage is introduced. The other end portion of the cylindrical body 20 may be closed or connected to another duct having a closed portion. The cylindrical body 20 may be made of a magnetostrictive material.

As shown in FIG. 4, a peripheral wall portion 21 of the cylindrical body 20 may have a uniform thickness and be curved in an axial direction Z of the cylindrical body 20. In other words, the cylindrical body 20 may have an outer diameter and an inner diameter varying along the axial direction Z. In still other words, a longitudinal section of the peripheral wall portion 21 of the cylindrical body 20 along a plane including an axis of the cylindrical body 20 may have a curved portion. The peripheral wall portion 21 may have small diameter portions 23 and 24 having relatively small outer and inner diameters and a large diameter portion 25 provided between the small diameter portions 23 and 24 and having relatively large outer and inner diameters. Between the small diameter portion 23 and the large diameter portion 25 and between the small diameter portion 24 and the large diameter portion 25, continuation portions 26 and 27 having outer and inner diameters gradually decreasing toward the small diameter portions 23 and 24 may be provided, respectively. The continuation portions 26 and 27 may have inclined inner-side and outer-side surfaces. Furthermore, on an outer periphery of the cylindrical body 20, there may be provided a magnetic field generation portion 28 configured similarly to the magnetic field generation portion 18 of the first embodiment.

A detection portion 100 may be provided outside the cylindrical body 20. Specifically, the detection portion 100 may be provided in a vicinity of either of the continuation portions 26 and 27. Next, with reference to FIG. 4, a description is given of a function of the pressure sensor. In the vicinities of the continuation portions 26 and 27, a magnetic flux density in a direction parallel to the axial direction Z may be relatively increased because of magnetic flux generated from the small diameter portions 23 and 24 and magnetic flux generated from the large diameter portion 25. For this reason, when the cylindrical body 20 made of a magnetostrictive material is subjected to stress, a change amount in magnetization direction may tend to be relatively increased in the vicinities of the continuation portions 26 and 27, and thus detection of a change in pressure by the detection portion 100 may be facilitated.

When a pressure in the cylindrical body 20 rises with a rise in pressure in the exhaust passage, the cylindrical body 20 may isotropically expand in such a direction that a diameter of the cylindrical body 20 increases. Since the inner-side surfaces of the continuation portions 26 and 27 may be inclined, the continuation portions 26 and 27 may expand not only in a direction parallel to a radial direction R (namely, a direction orthogonal to the axial direction Z) but also in a direction parallel to the axial direction Z. The peripheral wall portion 21 as a whole may be subjected to tensile stress mainly in a circumferential direction θ (see FIG. 3). This may cause a change in magnetization (magnetic flux) direction of the peripheral wall portion 21, so that a voltage may be induced in the detection portion 100. The detection portion 100 may output an electric signal corresponding to the induced voltage to a detection circuit.

When a pressure in the exhaust passage falls after it has risen to such an extent as to cause expansion of the cylindrical body 20, the cylindrical body 20 may shrink. As a result, the peripheral wall portion 21 may be subjected to less tensile stress in the circumferential direction θ, so that a magnetization (magnetic flux) direction may change inversely to a case where the cylindrical body 20 has expanded. Based on an electric signal inputted from the detection portion 100, the detection circuit may arithmetically determine a pressure in the cylindrical body 20.

As thus described, according to the pressure sensor of this embodiment, the above-described effects (1) and (2) may be obtained, and the following effect can be further obtained. (4) Part of the peripheral wall portion 21 having a uniform thickness may protrude to a radially outer side of the cylindrical body 20 to form the large diameter portion 25, and thus the peripheral wall portion 21 may be curved in the axial direction Z. With this configuration, compared with a case where an outer peripheral surface of the peripheral wall portion 21 is made to protrude by making the peripheral wall portion 21 vary in thickness, a protruding amount of the peripheral wall portion 21 is easily adjustable, and thus the peripheral wall portion 21 can be so shaped that a change in magnetic field is easily detectable.

Third Embodiment

Figure 5:
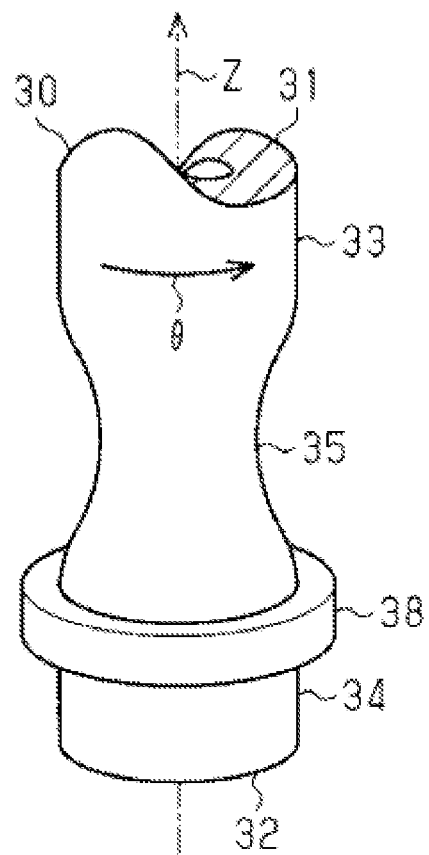
FIG. 5 is a perspective view showing part of a pressure sensor of a third embodiment of the present invention.
Figure 6:
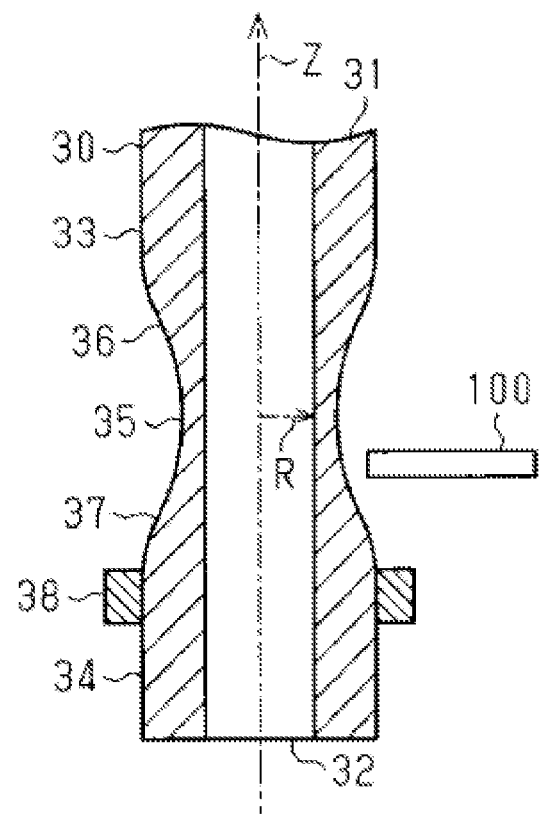
FIG. 6 is a sectional view of the pressure sensor of the third embodiment, as cut parallel to an axial direction of a cylindrical body.

Next, with reference to FIG. 5 and FIG. 6, a description is given of a pressure sensor of a third embodiment of the present invention by focusing on differences from the first embodiment. The pressure sensor according to this embodiment may also have a basic configuration equivalent to that of the first embodiment, for which a duplicate description is omitted.

As shown in FIG. 5, a cylindrical body 30 provided in the pressure sensor may be provided at one end portion thereof with an introduction port 32 into which exhaust gas in an exhaust passage is introduced. The other end portion of the cylindrical body 30 may be closed or connected to another duct having a closed portion. The cylindrical body 30 may be made of a magnetostrictive material, and on an outer periphery of the cylindrical body 30, there may be provided a magnetic field generation portion 38 configured similarly to the magnetic field generation portion 18 of the first embodiment.

As shown in FIG. 6, a peripheral wall portion 31 of the cylindrical body 30 may have a thickness (material thickness) continuously varying along an axial direction Z and thus be curved in the axial direction Z. The peripheral wall portion 31 may have a small diameter portion 35 having a relatively small outer diameter and large diameter portions 33 and 34 provided on both sides interposing the small diameter portion 35 therebetween and having a relatively large outer diameter. Between the small diameter portion 35 and the large diameter portion 33 and between the small diameter portion 35 and the large diameter portion 34, continuation portions 36 and 37 having an outer diameter gradually increasing from the small diameter portion 35 toward the large diameter portions 33 and 34 may be provided, respectively. The continuation portions 36 and 37 may each have an inclined outer-side surface.

A detection portion 100 may be provided outside the cylindrical body 30. Specifically, the detection portion 100 may be provided in a vicinity of either of the continuation portions 36 and 37. Next, with reference to FIG. 6, a description is given of a function of the pressure sensor. In the vicinities of the continuation portions 36 and 37, a magnetic flux density in a direction parallel to the axial direction Z may be relatively increased because of magnetic flux generated from the large diameter portions 33 and 34 and magnetic flux generated from the small diameter portion 35. For this reason, when the cylindrical body 30 made of a magnetostrictive material is subjected to stress, a change amount in magnetization direction may tend to be relatively increased in the vicinities of the continuation portions 36 and 37, and thus detection of a change in pressure by the detection portion 100 may be facilitated.

When a pressure in the cylindrical body 30 rises with a rise in pressure in the exhaust passage, the cylindrical body 30 may expand. The peripheral wall portion 31 as a whole may be subjected to tensile stress mainly in a circumferential direction θ (see FIG. 5). This may cause a change in magnetization (magnetic flux) direction of the peripheral wall portion 31, so that a voltage may be induced in the detection portion 100. The detection portion 100 may output an electric signal corresponding to the induced voltage to a detection circuit. Furthermore, when a pressure in the exhaust passage falls after it has risen to such an extent as to cause expansion of the cylindrical body 30, the cylindrical body 30 may shrink. As a result, the peripheral wall portion 31 may be subjected to less tensile stress in the circumferential direction θ, so that a magnetization (magnetic flux) direction may change inversely to a case where the cylindrical body 30 has expanded. Based on an electric signal inputted from the detection portion 100, the detection circuit may arithmetically determine a pressure in the cylindrical body 30.

As thus described, according to the pressure sensor of this embodiment, the above-described effects (1) and (2) may be obtained, and the following effect can be further obtained.

(5) The peripheral wall portion 31 may have a thickness continuously varying along the axial direction Z of the cylindrical body 30, and thus the peripheral wall portion 31 may be curved in the axial direction Z. Therefore, the detection portion 100 may be provided at a position where a thickness of the peripheral wall portion 31 varies, and thus a change in magnetization direction can be detected.

Fourth Embodiment

Figure 7:
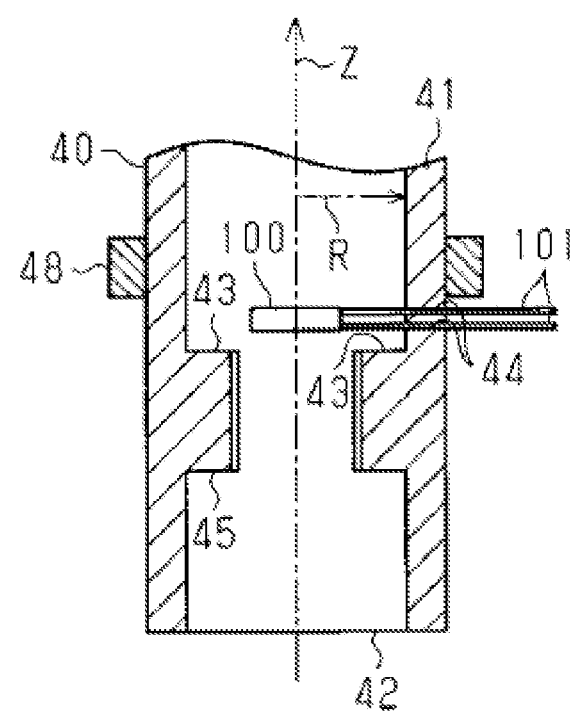
FIG. 7 is a sectional view of a pressure sensor of a fourth embodiment of the present invention, as cut parallel to an axial direction of a cylindrical body.
Figure 8:
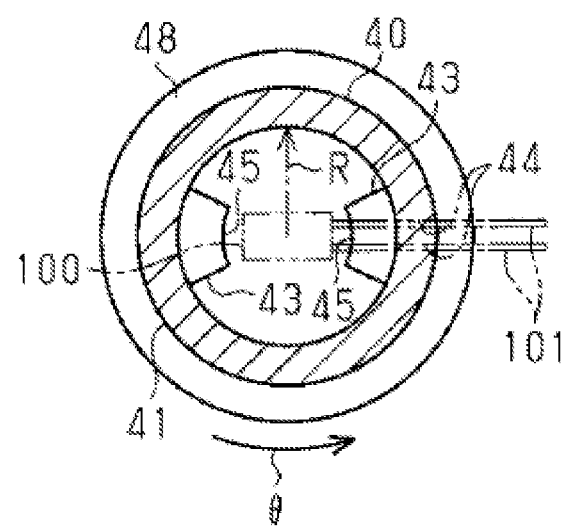
FIG. 8 is a sectional view of the pressure sensor of the fourth embodiment, as cut parallel to a radial direction of the cylindrical body (that is, perpendicularly to an axis of the cylindrical body).

Next, with reference to FIG. 7 and FIG. 8, a description is given of a pressure sensor of a fourth embodiment of the present invention by focusing on differences from the first embodiment. The pressure sensor according to this embodiment may also have a basic configuration equivalent to that of the first embodiment, for which a duplicate description is omitted.

As shown in FIG. 7, a cylindrical body 40 provided in the pressure sensor may be provided at one end portion thereof with an introduction port 42 into which exhaust gas in an exhaust passage is introduced. The other end portion of the cylindrical body 40 may be closed or connected to another duct having a closed portion. On an outer periphery of the cylindrical body 40, there may be provided a magnetic field generation portion 48 configured similarly to the magnetic field generation portion 18 of the first embodiment.

The cylindrical body 40 may be made of a magnetostrictive material. Furthermore, a peripheral wall portion 41 of the cylindrical body 40 may have a thickness (material thickness) varying stepwise along an axial direction Z and thus be provided with a stepped surface 43 intersecting with the axial direction Z of said cylindrical body 40. That is, a pair of protruding portions 45 may be formed on an inner side of the peripheral wall portion 41, and one or a plurality of surfaces of the protruding portions 45, which intersect with the axial direction Z, may each constitute the stepped surface 43. The protruding portions 45 may be both equal in protruding amount and shape to each other and be provided, respectively, at positions symmetrical to each other with respect to the axial direction Z. While, herein, the pair of protruding portions 45 may be provided in the peripheral wall portion 41, it may be sufficient that at least one protruding portion 45 is provided.

As shown in FIG. 8, the protruding portions 45 may be both formed at positions on an inner peripheral surface of the peripheral wall portion 41, which are separated by 180 degrees from each other. Furthermore, inside the cylindrical body 40, a detection portion 100 may be provided between the pair of protruding portions 45 or in a vicinity of one of the protruding portions 45. In FIG. 8, the detection portion 100 may be provided between the pair of protruding portions

45. The detection portion 100 may be provided with connection lines 101 connecting to a detection circuit, and the connection lines 101 may be led out to an exterior via insertion holes 44 formed through the peripheral wall portion 41. When provided inside the cylindrical body 40, the detection portion 100 may be exposed to high-temperature exhaust gas. Thus, preferably, in this case, a temperature detection portion such as a thermocouple may be provided in a vicinity of the detection portion 100. Further, preferably, it may be judged whether or not a temperature detected by the temperature detection portion falls within such a temperature range as to enable detection by the detection portion 100. Or alternatively, it may also be possible that a pressure detected by the detection portion 100 is corrected based on a temperature thus detected.

Next, with reference to FIG. 8, a description is given of a function of the pressure sensor. In the vicinities of the protruding portions 45, a magnetic flux density in a direction parallel to the axial direction Z may be relatively increased because of magnetic flux generated from the protruding portions 45 and magnetic flux generated from a region of the peripheral wall portion 41 other than the positions at which the protruding portions 45 are provided. Furthermore, depending on a protruding amount of each of the protruding portions 45, a thickness of the peripheral wall portion 41 including the each of the protruding portions 45 may be increased, in which case stress in a direction parallel to a radial direction of the peripheral wall portion 41 (namely, a direction orthogonal to the axial direction Z) may be increased. For this reason, when the cylindrical body 40 made of a magnetostrictive material is subjected to stress, a change amount in magnetization direction may tend to be relatively increased in the vicinities of the protruding portions 45, and thus detection of a change in pressure by the detection portion 100 may be facilitated.

When a pressure in the cylindrical body 40 rises with a rise in pressure in the exhaust passage, the cylindrical body 40 may expand. The peripheral wall portion 41 as a whole may be subjected to tensile stress mainly in a circumferential direction θ. This may cause a change in magnetization (magnetic flux) direction of the peripheral wall portion 41, so that a voltage may be induced in the detection portion 100. The detection portion 100 may output an electric signal corresponding to the induced voltage to the detection circuit. Furthermore, when a pressure in the exhaust passage falls after it has risen to such an extent as to cause expansion of the cylindrical body 40, the cylindrical body 40 may shrink. As a result, the peripheral wall portion 41 may be subjected to less tensile stress in the circumferential direction θ, so that a magnetization (magnetic flux) direction may change inversely to a case where the cylindrical body 40 has expanded. Based on an electric signal from the detection portion 100, the detection circuit may arithmetically determine a pressure in the cylindrical body 40.

As thus described, according to the pressure sensor of this embodiment, the above-described effect (2) may be obtained, and the following effects can further be obtained. (6) The cylindrical body 40 itself configured to receive a pressure of exhaust gas, which is a fluid, may be made of a magnetostrictive material, and a change in magnetization direction caused by distortion of the magnetostrictive material may be detected by the detection portion 100. Thus, compared with a sensor in which a pressure receiving portion configured to receive a pressure of a fluid and a magnetostrictive material are provided as separate bodies, a change in pressure can be directly detected. Furthermore, since the peripheral wall portion 41 of the cylindrical body 40 may be provided with the stepped surface 43 intersecting with the axial direction Z, a change in magnetic field in the axial direction Z when the cylindrical body 40 is distorted is increased, and thus detection of a change in magnetic field can be facilitated.

(7) The peripheral wall portion 41 may have a thickness varying stepwise along the axial direction Z of the cylindrical body 40, and thus the stepped surface 43 may be formed. Therefore, the detection portion 100 may be provided at a position where a thickness of the peripheral wall portion varies, and thus a change in magnetization direction can be detected.

Fifth Embodiment

Figure 9:
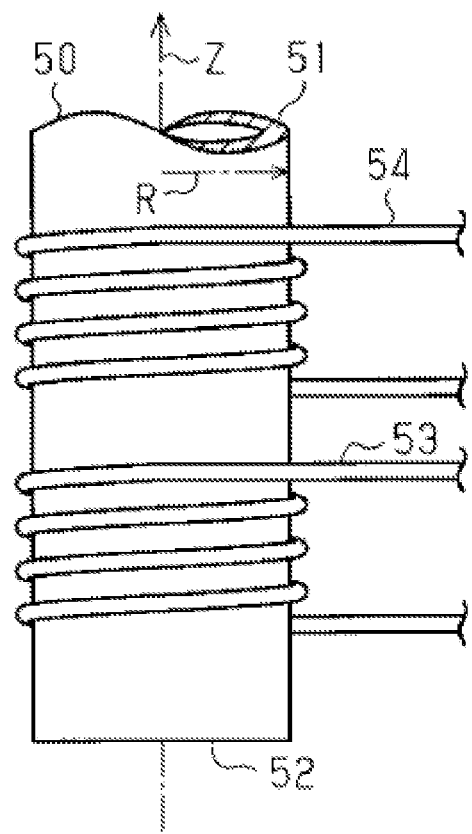
FIG. 9 is a side view showing part of a pressure sensor of a fifth embodiment of the present invention.
Figure 10:
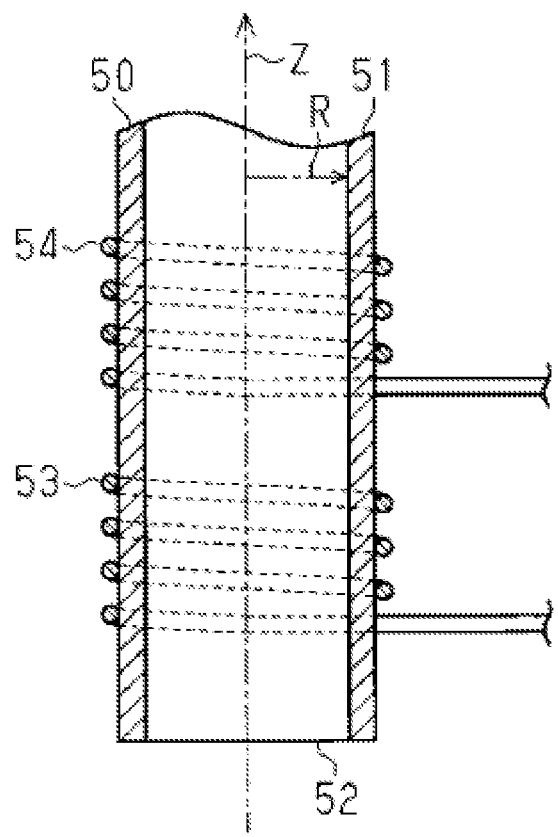
FIG. 10 is a sectional view of the pressure sensor of the fifth embodiment, as cut parallel to an axial direction of a cylindrical body.

Next, with reference to FIG. 9 and FIG. 10, a description is given of a pressure sensor of a fifth embodiment of the present invention by focusing on differences from the first embodiment. The pressure sensor according to this embodiment may also have a basic configuration equivalent to that of the first embodiment, for which a duplicate description is omitted.

As shown in FIG. 9, a cylindrical body 50 provided in the pressure sensor may be provided at one end portion thereof with an introduction port 52 into which exhaust gas in an exhaust passage is introduced. The other end portion of the cylindrical body 50 may be closed or connected to another duct having a closed portion. The cylindrical body 50 may be made of a magnetostrictive material whose magnetization direction changes under stress.

As shown in FIG. 10, the cylindrical body 50 may be formed in a circular cylinder shape, and a peripheral wall portion 51 of the cylindrical body 50 may have a uniform thickness. In a case where a magnetostrictive material is formed in a cylinder shape as described above, with a change in pressure, stress may be generated in a circumferential direction, a radial direction, and an axial direction of the cylinder-shaped magnetostrictive material. Because of this, it may be required that a change in magnetization direction be detected by a detection method different from a method used for a pressure sensor using a conventional plate-shaped magnetostrictive material.

From this viewpoint, in this embodiment, an excitation coil 54 and a detection coil 53 may be wound on an outer periphery of the cylindrical body 50. The excitation coil 54 may be supplied with an electric current to generate a magnetic field along a direction parallel to an axial direction Z of the cylindrical body 50, thus increasing a change amount in magnetization direction along the direction parallel to the axial direction Z. As a result of a change in magnetization direction of the cylindrical body 50, a voltage may be induced in the detection coil 53. The detection coil 53 may output an electric signal corresponding to the induced voltage to a detection circuit.

Next, with reference to FIG. 10, a description is given of a function of the pressure sensor. When a pressure in the cylindrical body 50 rises with a rise in pressure in the exhaust passage, the cylindrical body 50 may expand. The peripheral wall portion 51 as a whole may be subjected to tensile stress mainly in a circumferential direction θ. This may cause a change in magnetization (magnetic flux) direction of the peripheral wall portion 51, so that a voltage may be induced in the detection coil 53. The detection coil 53 may output an electric signal corresponding to the induced voltage to a detection circuit. Furthermore, when a pressure in the exhaust passage falls after it has risen to such an extent as to cause expansion of the cylindrical body 50, the cylindrical body 50 may shrink. As a result, the peripheral wall portion 51 may be subjected to less tensile stress in the circumferential direction θ, so that a magnetization (magnetic flux) direction may change inversely to a case where the cylindrical body 50 has expanded. Based on an electric signal from the detection coil 53, the detection circuit may arithmetically determine a pressure in the cylindrical body 50.

As thus described, according to the pressure sensor of this embodiment, the following effect can be obtained. (8) When the cylindrical body 50 is distorted in a radial direction with a change in pressure of exhaust gas, which is a fluid, a change in magnetic field caused by such distortion of the cylindrical body 50 can be detected by the detection coil 53. Thus, a change in pressure of a fluid can be directly detected.

Other Embodiments

Figure 11:
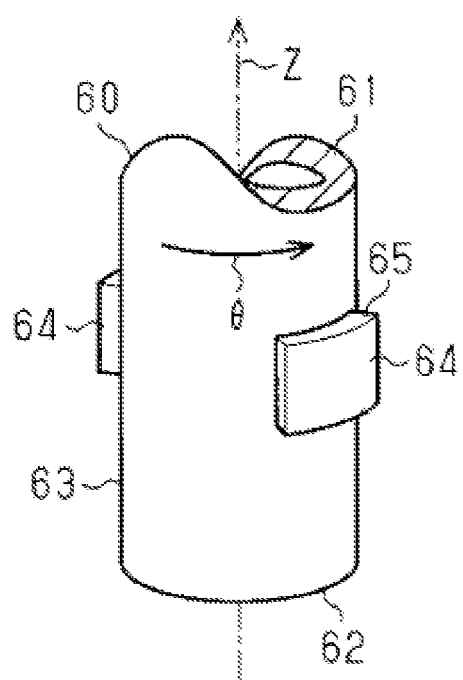
FIG. 11 is a perspective view showing part of a pressure sensor as a modification example of the present invention.

The foregoing embodiments can also be implemented in the forms of embodiments described below. As shown in FIG. 11, it may also be possible that in a pressure sensor in which a peripheral wall portion 61 of a cylindrical body 60 has a thickness varying along an axial direction Z of the cylindrical body 60, a protruding portion(s) 64 having a stepped surface 65 intersecting with the axial direction Z of the cylindrical body 60 is provided on an outer peripheral surface 63 of the peripheral wall portion 61 of the cylindrical body 60 having an introduction port 62. It may also be possible that the protruding portion(s) 64 is provided at part of the outer peripheral surface 63 in a circumferential direction θ or provided to extend over an entire circumference of the outer peripheral surface 63. Furthermore, with regard also to the protruding portions 45 of the fourth embodiment, it may also be possible that the protruding portions 45 are provided to extend over an entire circumference of the inner peripheral surface of the peripheral wall portion 41. Furthermore, in the pressure sensor shown in FIG. 11, it may also be possible to provide, on an outer periphery of the cylindrical body 60, a magnetic field generation portion that generates a magnetic field in which a magnetic flux direction includes a direction parallel to the axial direction Z of the cylindrical body 60.

Figure 12:
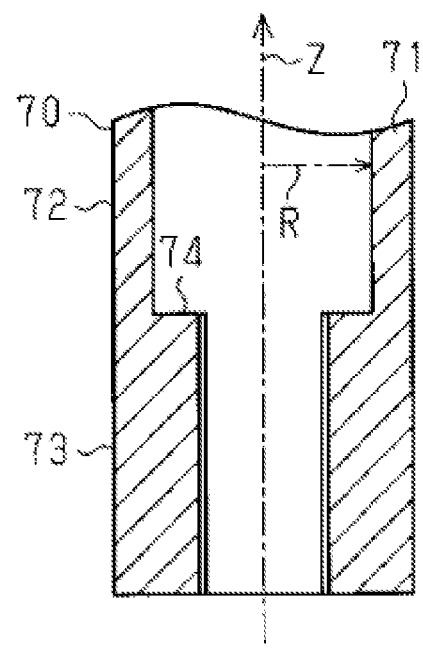
FIG. 12 is a sectional view of a pressure sensor as a modification example of the present invention, as cut parallel to an axial direction of a cylindrical body.

As shown in FIG. 12, it may also be possible that in a pressure sensor in which a peripheral wall portion 71 of a cylindrical body 70 has a thickness varying along an axial direction Z of the cylindrical body 70, the peripheral wall portion 71 of the cylindrical body 70 is provided with a thin portion 72 and a thick portion 73 so that a stepped surface 74 is formed therebetween. The peripheral wall portion 71 of the cylindrical body 70 may have a thickness varying stepwise along the axial direction Z of the cylindrical body 70, and thus the peripheral wall portion 71 of the cylindrical body 70 may be bent in the axial direction Z of the cylindrical body 70. In this case, in a vicinity of the stepped surface 74, a change amount in magnetization direction in a direction parallel to the axial direction Z can be increased. Furthermore, in this pressure sensor, it may also be possible to provide, on an outer periphery of the cylindrical body 70, a magnetic field generation portion that generates a magnetic field in which a magnetic flux direction includes the direction parallel to the axial direction Z of the cylindrical body 70.

In the fourth embodiment, it may also be possible that a tapered surface is provided on both sides of each of the protruding portions 45 in the axial direction, and thus the each of the protruding portions 45 and the inner peripheral surface of the peripheral wall portion 41 are connected to each other via the tapered surface. That is, it may also be possible that the stepped surface 43 shown in FIG. 7 intersects non-perpendicularly with the axial direction Z of the cylindrical body 40 instead of intersecting perpendicularly with the axial direction Z of the cylindrical body 40.

The fourth embodiment has explained that the pair of protruding portions 45 equal in protruding amount to each other may be provided in the cylindrical body 40, and the detection portion 100 may be disposed between the protruding portions 45. As an aspect other than this, it may also be possible that only one protruding portion is provided inside the peripheral wall portion 41, and a detection portion is provided on the protruding portion. Or alternatively, it may also be possible that a pair of protruding portions different in protruding amount from each other are formed inside the peripheral wall portion 41, and the detection portion 100 is provided on each of both the protruding portions. In this case, for example, it may also be possible that one of the detection portions 100, which is provided on one of the protruding portions, which has a larger protruding amount, is used as a reference detection portion. Further, it may also be possible that a change in pressure is detected based on a difference between a value detected by the other detection portion 100 provided on the other protruding portion having a smaller protruding amount and a value detected by the reference detection portion 100.

In each of the first to third embodiments, the fifth embodiment, and the above-described other embodiments, it may also be possible that, as in the fourth embodiment, a temperature detection portion such as a thermocouple is provided in a vicinity of the detection portion 100. A reason for this may be that even when disposed outside the cylindrical body, in some cases, the detection portion 100 is placed under a high-temperature environment. Further, preferably, it may be judged whether or not a temperature detected by the temperature detection portion falls within such a temperature range as to enable detection by the detection portion 100. Or alternatively, it may also be possible that a pressure detected by the detection portion 100 is corrected based on a temperature thus detected.

Figure 13:
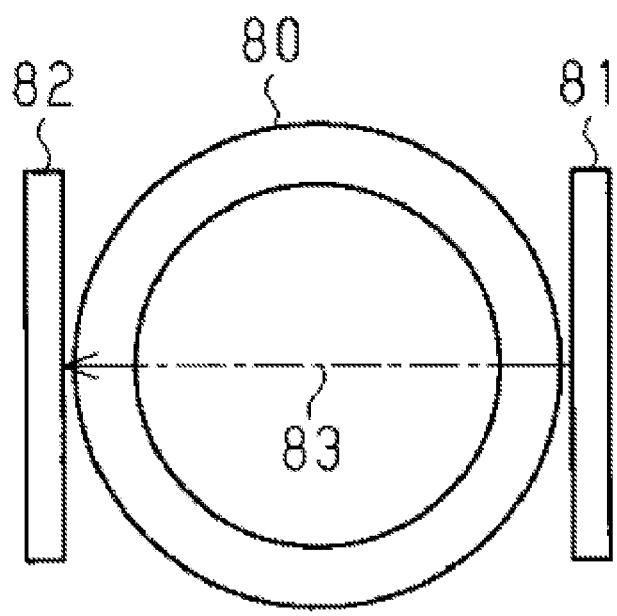
FIG. 13 is a sectional view of a pressure sensor as a modification example of the present invention, as cut parallel to a radial direction of a cylindrical body.

In the first to fifth embodiments, it may also be possible that, as each of the magnetic field generation portions 18, 28, 38, and 48, a plurality of magnetic field generation portions are provided in the cylindrical body 10. As shown in FIG. 13, it may also be possible that, outside a cylindrical body 80, magnets 81 and 82 are provided on both sides interposing the cylindrical body 80 therebetween. The magnet 81 may be an N-pole magnet, and the magnet 82 may be an S-pole magnet. The magnets 81 and 82 may generate a magnetic field in a direction 83 orthogonal to an axis of the cylindrical body 80. A peripheral wall portion of the cylindrical body 80 may be curved or bent in an axial direction of the cylindrical body 80. Also in this configuration, a change in magnetic field of the cylindrical body 80 may be increased, and thus detection of a change in magnetic field can be facilitated. It may also be possible that a magnetic field generation portion that generates a magnetic field in the direction 83 orthogonal to the axis of the cylindrical body 80 takes a form other than the magnets 81 and 82, such as, for example, a form of a semicircular magnet.

Each of the first to fifth embodiments has explained that the magnetic field generation portion may generate a magnetic field along the axial direction of the cylindrical body. Other than this, it may also be possible that the magnetic field generation portion generates a magnetic field along the circumferential direction of the cylindrical body. Furthermore, it may also be possible that the magnetic field generation portion generates a magnetic field in a radial manner from the center axis of the cylindrical body toward the peripheral wall portion.

While each of the foregoing embodiments has explained that there is provided the magnetic field generation portion that generates a magnetic field in the axial direction of the cylindrical body, in a case where a change in magnetic field detectable by the detection portion 100 is caused only by stress exerted on the cylindrical body, it may also be possible to omit the magnetic field generation portion.

While each of the first to third embodiments has explained that the peripheral wall portion of the cylindrical body may be curved in the axial direction of the cylindrical body, instead, it may also be possible that the peripheral wall portion of the cylindrical body is bent in the axial direction of the cylindrical body. That is, it may also be possible that the peripheral wall portion of the cylindrical body is such that a longitudinal section thereof along the plane including the axis of the cylindrical body has a bent portion or has a portion having a thickness varying stepwise along the axis of the cylindrical body.

It may also be possible that, as in the fifth embodiment, a detection coil in which a voltage is induced due to a change in magnetization direction is provided with respect to each of the cylindrical bodies 10, 20, 30, and 40 of the first to fourth embodiments. Furthermore, it may also be possible that an excitation coil that generates a magnetic field along a direction parallel to an axial direction of a cylindrical body is provided in each of the cylindrical bodies 10, 20, 30, and 40.

Figure 14:
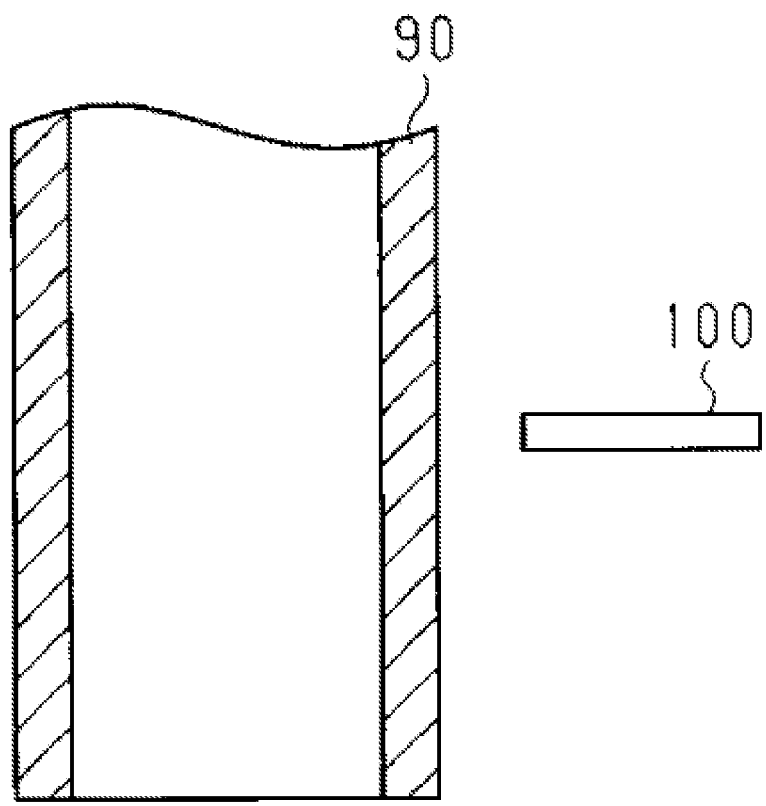
FIG. 14 is a sectional view of a pressure sensor as a modification example, as cut parallel to an axial direction of a cylindrical body.

FIG. 14 shows another embodiment of the pressure sensor. This pressure sensor may have a circular cylinder shape and be provided with a cylindrical body 90 having constant outer and inner diameters. The cylindrical body 90 may be made of a magnetostrictive material. Exhaust gas in an exhaust passage may be introduced into the cylindrical body 90 through one end portion thereof. The other end portion of the cylindrical body 90 may be closed or connected to another duct having a closed portion. When a pressure in the cylindrical body 90 rises with a rise in pressure in the exhaust passage, the cylindrical body 90 may expand in such a direction that a diameter of the cylindrical body 90 increases. The peripheral wall portion 90 as a whole may be subjected to tensile stress mainly in a circumferential direction. This may cause a change in magnetization (magnetic flux) direction of the cylindrical body 90, so that a voltage may be induced in a detection portion 100. The detection portion 100 may output an electric signal corresponding to the induced voltage to a detection circuit (not shown).

Next, the following additionally describes technical ideas that can be grasped from the foregoing embodiments and modification examples, along with effects thereof. (a) A pressure sensor provided with a cylindrical body made of a magnetostrictive material and configured to be deformed with a change in pressure of a fluid flowing inside and a detection coil wound on an outer peripheral surface of the cylindrical body.

According to the above-described configuration, when the cylindrical body is distorted with a change in pressure of a fluid, a change in magnetic field caused by such distortion of the cylindrical body can be detected by the detection coil. Thus, a change in pressure of a fluid can be directly detected.

The present invention is not limited to the embodiments and examples illustratively described. For example, it is not to be construed that all features of a particular embodiment disclosed are essential to the present invention, but rather, the subject of the present invention may be present in less than all the features of the particular embodiment disclosed.

LIST OF REFERENCE NUMBERS 10, 20, 30, 40, 50, 60, 70 cylindrical body
11, 21, 31, 41, 51, 61, 71 peripheral wall portion
12, 22, 32, 42, 52 introduction port
18, 28, 38, 48 magnetic field generation portion
54 excitation coil as magnetic field generation portion
43, 74 stepped surface
45, 64 protruding portion
100 detection portion

The invention claimed is:

1. A pressure sensor, comprising:
a cylindrical body made of a magnetostrictive material and configured to be deformed under a pressure of a fluid flowing inside; and
a detection portion for detecting a change in magnetic field caused by distortion of the cylindrical body,
wherein the cylindrical body includes a peripheral wall portion that is either curved or bent in an axial direction of said cylindrical body,
wherein the peripheral wall portion of the cylindrical body has a uniform thickness, and
wherein a part of the peripheral wall portion in the axial direction of the cylindrical body protrudes to a radially inner side or a radially outer side of the cylindrical body.

2. The pressure sensor according to claim 1, further comprising:
a magnetic field generation portion provided on an outer periphery of the cylindrical body and configured to generate a magnetic field in which a magnetic flux direction includes a direction parallel to the axial direction of said cylindrical body.

3. A pressure sensor, comprising:
a cylindrical body made of a magnetostrictive material and configured to be deformed under a pressure of a fluid flowing inside, the cylindrical body including a peripheral wall portion from which one or more protruding portions protrudes to a radially inner side, wherein one or more surfaces of the one or more protruding portions intersect with an axial direction of the cylindrical body and each constitute a stepped surface; and
a detection portion for detecting a change in magnetic field of the cylindrical body.

4. The pressure sensor according to claim 3, further comprising:
a magnetic field generation portion provided on an outer periphery of the cylindrical body and configured to generate a magnetic field in which a magnetic flux direction includes a direction parallel to the axial direction of said cylindrical body.

* * * * *